United States Patent [19]

Griffiths et al.

[11] Patent Number: 4,851,129

[45] Date of Patent: Jul. 25, 1989

[54] PROCESS FOR THE DETOXIFICATION OF EFFLUENTS FROM ORE PROCESSING OPERATIONS WITH HYDROGEN PEROXIDE, USING A MAGNETIC PRE-SEPARATION STAGE

[75] Inventors: Andrew Griffiths, Ridgewood, N.J.; Roy Norcross, Stamford, Conn.

[73] Assignee: Degussa Aktiengesellschaft, Frankfurt, Fed. Rep. of Germany

[21] Appl. No.: 183,635

[22] Filed: Apr. 19, 1988

[51] Int. Cl.⁴ .......................... B01D 35/06; C02F 1/72
[52] U.S. Cl. .................................... 210/695; 210/759; 210/765; 210/790; 210/803; 210/804; 209/214; 209/215; 209/219; 209/232; 209/478; 209/2; 209/10
[58] Field of Search ............... 210/695, 759, 765, 790, 210/803, 804; 209/214, 215, 219, 232, 478, 10, 2; 423/328; 75/1 R

[56] References Cited

U.S. PATENT DOCUMENTS

| | | | |
|---|---|---|---|
| 4,033,866 | 7/1977 | Enzmann | 210/695 |
| 4,416,786 | 11/1983 | Knorre et al. | 210/746 |
| 4,510,254 | 4/1985 | Morris et al. | 75/1 R |

FOREIGN PATENT DOCUMENTS

| | | | |
|---|---|---|---|
| 0133869 | 3/1985 | European Pat. Off. | 210/695 |
| 54-20466 | 2/1979 | Japan | 210/695 |
| 57-34083 | 2/1983 | Japan | 210/759 |

Primary Examiner—Richard V. Fisher
Assistant Examiner—Cynthia L. Nessler
Attorney, Agent, or Firm—Beveridge, DeGrandi & Weilacher

[57] ABSTRACT

A process for treating effluents containing cyanide from mining operations wherein magnetic separation is used prior to treatment with hydrogen peroxide.

4 Claims, 1 Drawing Sheet

PROCESS FOR THE DETOXIFICATION OF EFFLUENTS FROM ORE PROCESSING OPERATIONS WITH HYDROGEN PEROXIDE, USING A MAGNETIC PRE-SEPARATION STAGE

BACKGROUND OF THE INVENTION

The present invention relates to the process for the detoxification of effluents obtained in a variety of ore processing operations utilizing hydrogen peroxide and a magnetic pre-separation stage.

Purification of waste waters and recovery of components thereof is of major importance in connection with protection of the environment. Effluents from a variety of mining operations, particularly effluents from precious metal extraction plants and base metal flotation plants often contain cyanide in various forms together with toxic metals. The recovery of such substances and the removal thereof from effluent is of paramount importance before such waste waters are discharged in order to avoid serious damage to the environment and adverse impact on public health and safety.

A number of methods have been developed over the years of the treatment of such effluents. One of the best of the known methods for treating effluents originating from mining operations involves the oxidation of the cyanide contained in the waste water with hydrogen peroxide. Heavy metals contained in such waste effluents are usually removed by precipitation as a part of the overall process. These methods have been used successfully on a commercial scale for a number of years and are known to have a number of advantages over the even older methods such as treatment with chlorine because the excess hydrogen peroxide that is utilized decomposes to give ony water and oxygen. In the older methods involving chlorine, undesirable salts were formed and introduced into the waste water. The utilization of hydrogen peroxide overcomes the disadvantages associated with methods which involve salt formation and the introduction of those salts into waste water.

In many such operations, the waste effluent takes the form of so-called tailings pulp or slurry wherein the proportion of solids may be 50% or higher. Hydrogen peroxide has been successfully used to treat such pulp containing effluents and has been demonstrated on a commercial scale. In such operations, it has been found that the processing of some types of ore leads to tailings pulp which requires very large amounts of hydrogen peroxide for treatment. In such cases, the economic viability of the detoxification process depends on reducing the consumption of effluent treatment chemicals as far as possible.

One method for reducing the consumption of hydrogen peroxide by accurate measurement of the oxidizing agent demand and control of the dosage thereof is shown in U.S. Pat. No. 4,416,786, assigned to the same assignee as the present application and which is relied on and incorporated herein by reference. This method has been shown to be successful in preventing unnecessary excess dosing of the hydrogen peroxide. It is also been found to be suitable for adapting the dosage to change in concentrations of cyanide and other oxidizable substances in the effluent. It has been found, however, that if tailings contain solids which cause catalytic decomposition of the hydrogen peroxide, there could result a wastage of the reagent.

It is a purpose of the present invention therefore to prevent or minimize the unnecessary excess or waste of hydrogen peroxide during the treatment of effluent obtained from mining operations which may be caused by certain solid components of the tailings pulp.

SUMMARY OF THE INVENTION

It has been found that the excessive consumption of hydrogen peroxide caused by certain tailings pulps is due in large measure to magnetic components of the solids content. After the magnetic components have been selectively removed, the consumption of hydrogen peroxide is reduced considerably without significantly affecting the results of detoxification. The process is characterized by the following essential steps:

(a) removal of significant amount of the magnetic components from the tailings pulp, using a magnetic separator of a type commercially available for other uses in the minerals industry;

(b) washing the magnetic material with water to remove any cyanide adhering thereto and recycling the cyanide to the main tailings stream;

(c) detoxification of the main tailings stream by known processes using hydrogen peroxide; and (d) discharge of the two streams, either together or separately, into conventional tailings ponds, where the solids are allowed to settle out.

BRIEF DESCRIPTION OF THE DRAWING

The invention will be further understood with reference to FIG. 1 which is a schematic flow diagram of one embodiment of the method of the present invention.

DETAILED DESCRIPTION OF THE INVENTION

Figure 1:
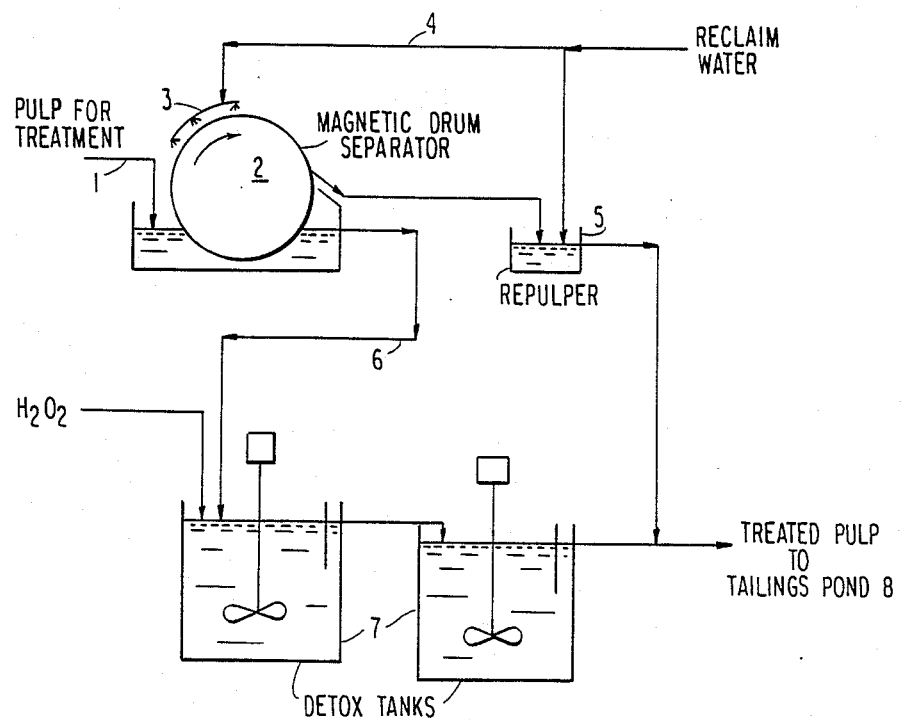

In FIG. 1, there is shown a schematic flow diagram of a method in accordance with the present invention for the magnetic separation of metallic components from the pulp received from mining operations. Thus, the stream of pulp (1) emanating from an ore processing plant (not shown) is conveyed in a conduit to a magnetic separator (2). The magnetic separator depicted in FIG. 1 and suitable for purposes of the present invention is the type which is known as a magnetic drum separator and which is particularly well suited for the method of the present invention. One such device is model HMDA wet drum separator of Eriez Magnetics, Erie, Pa. This unit has a 36 inch diameter and is 10 feet long and can accommodate a flow rate of 250 m$^3$ pulp/hour (1100 gpm). Because of the possibility of attaching spray bars (3), it is possible to wash the magnetic material after separation from the liquid.

Magnetic material is picked up and held by the rotating drum. Either fresh water or detoxified reclaimed water is conveyed in a conduit (4) to the rotating drum and is used to wash the magnetic material thereby removing any cyanide adhering to the magnetic material. The cyanide is then returned to the main tailings stream in the tank immediately below the rotating drum. Such rotating magnetic separation drums are known in the art and the details thereof can be readily determined by persons skilled in this technology.

After washing, the magnetic material is separated from the drum and conveyed to are pulping station (5) where it is treated with fresh water or cleaned reclaimed water to form a treated magnetic pulp. This material can either be returned to the main stream subsequent to the main stream detoxification stage or disposed of separately.

FIG. 1 shows the magnetic material added to the main tailings stream before going to a tailings pond (8) for settling of the magnetic material. The magnetic material accounts for about 1 to about 20% of the total solids of the initial pulp material that is treated in accordance with the invention.

The demagnetized main stream (6) is a stream in the form of a gulp or slurry which passes to a conventional detoxification plant (7) wherein the treatment with hydrogen peroxide takes place. This step can be carried out with hydrogen peroxide or a compound suitable and capable of releasing hydrogen peroxide under the conditions of the reaction. The demagnetized main stream which leaves the magnetic drum separator (2) proceeds to one or more detoxification tanks generally equipped with propeller-type stirrers where the hydrogen peroxide or hydrogen peroxide yielding substance is introduced. The stirrers mix the chemicals and keep the solids in suspension. The tanks are usually connected in series and the hydrogen peroxide is usually added to the first tank only. Such treating plants are well known and the techniques involved in the operation of detoxification tanks is well known.

The rate of dosing of $H_2O_2$ is well known and depends on many factors, such as concentrations of cyanide and other oxidizable substances, presence of catalytic decomposition agents, degree of detoxification and the like. Generally, the dosage rate is expressed in terms of the mole ratio $H_2O_2:CN$ whereby only the oxidizable forms of cyanide are indicated. Recommended is a dosage rate of at least 2 and preferably about 3, although it can be up to 5 or higher.

The concentration of hydrogen peroxide used is generally between about 25 and 70%.

After detoxification, the treated pulp is allowed to flow under gravity, or is pumped to the tailings pond (8). Sometimes a thickener is used to recover water for reuse.

One or more stages of the detoxification can be utilized in accordance with procedures known in the art. A catalyst such as copper (II) sulfate solution may be added to accelerate the reaction between the hydrogen peroxide and cyanide, and also to precipitate ferrocyanide as copper (II) ferrocyanide. Utilization of other additives, adjuvants, accelerators and the like which are used in such detoxification plants can also be used for purposes of the present invention provided they do not interfere with the operation of the overall process.

It is possible to include additional steps in the detoxification process such as the adjustment of the pH or the addition of other reagents to precipitate heavy metals, if the nature of the tailings pulp or the environmental regulations require such steps. For example, the pH of the stream is sometimes appropriately lowered by addition of sulfuric acid to a pH of about 8.5 after the $H_2O_2$ treatment. In such cases, the pulp can be discharged to the tailings pond without further changes in the pH.

Following detoxification, the treated tailings pulp is collected and either individually or together conveyed to the conventional tailings pond (8) where the solids are permitted to settle out. Water may be decanted from the tailings pond and used as reclaimed water in the process to wash and repulp the magnetic material.

To achieve significant savings in hydrogen peroxide, it is not necessary to remove 100% of the magnetic material. Even the removal of 50% of the magnetic material, for example, has been found to be beneficial. In some cases, this means removing only 5% or less of the total solids in the tailings pulp which signifies that the equipment for separating, washing and repulping the magnetic material is small relative to the equipment used to handle and treat the main stream.

It therefore follows as a result that the cost of removing magnetic material before detoxification in many cases is quite small compared to the savings of the reagent cost, particularly that of hydrogen peroxide.

It has also been found that the amount of copper sulfate added as a catalyst to accelerate the action can also be reduced if magnetic pre-separation is used on the tailings.

The following example serves to illustrate the present invention:

EXAMPLE 1

A tailings pulp was regenerated in a gold extraction pilot plant using ore from a gold mine in California. The effluent contained 57% solids and a concentration of 203 mg weak acid dissociable cyanide (CN(WAD)) per liter of the liquid phase. Testwork showed that the CN(WAD) could be reduced to 2.0 or 0.1 mg/l using the following additions of reagents:

| Reagent addition per metric ton of tailings pulp | | CN(WAD) after treatment |
|---|---|---|
| Liters $H_2O_2$ (70%) | kg $CuSO_4.5H_2O$ | |
| 2.2 | 0.53 | 0.1 |
| 1.87 | 0.53 | 1.5–2.0 |

After removing approximately 50% of the magnetic material with a hand-held magnet, the testwork was repeated.

Results with magnetic pre-separation:

| Reagent addition per metric ton of tailings pulp | | CN(WAD) after treatment |
|---|---|---|
| Liters $H_2O_2$ (70%) | kg $CuSO_4.5H_2O$ | |
| 1.1 | 0.18 | 0.2 |

Lime was added to maintain the pH about 9.5.

Comparing these comsumptions with the previous ones, the magnetic pre-separation has resulted in savings of approximately 50% for hydrogen peroxide and over 60% for copper (II) sulfate. The actual savings are slightly higher than these figures indicate, since by removing the magnetic material, which amounted to about 5% of the total solids, the pulp density had been reduced slightly thus increasing the amount of cyanide contained in each metric ton of pulp. About 5% more cyanide has therefore been oxidized with 50% less hydrogen peroxide and over 60% less copper (II) sulfate.

Further variations and modifications of the foregoing will be apparent to those skilled in the art and are intended to be encompassed by the appended claims.

We claim:

1. A method for detoxification of liquid effluents containing cyanide from ore processing operations comprising treatment of a pulp containing magnetic substances and obtained from an ore processing operation to magnetically separate from said pulp a significant proportion of the magnetic substances contained therein, and contacting the remaining material with sufficient hydrogen peroxide or hydrogen peroxide generating substance to react with the cyanide present in said material.

2. The method in accordance with claim 1 wherein the magnetic substances are separated and subsequently treated with water to form a slurry which is permitted to settle in order to separate out the magnetic substances.

3. The method in accordance with claim 1 wherein the material from which the magnetic substances have been removed is sent to a plurality of detoxification zones wherein it is successively treated with hydrogen peroxide in a sufficient amount to react with the cyanide present therein.

4. The method in accordance with claim 1 wherein the magnetic substances after separation from the cyanide containing liquid effluent are washed with water to remove any cyanide adhering to said magnetic substances and the cyanide containing water is returned to the main stream of cyanide containing material, which is treated with hydrogen peroxide.

* * * * *